Patented Jan. 10, 1950

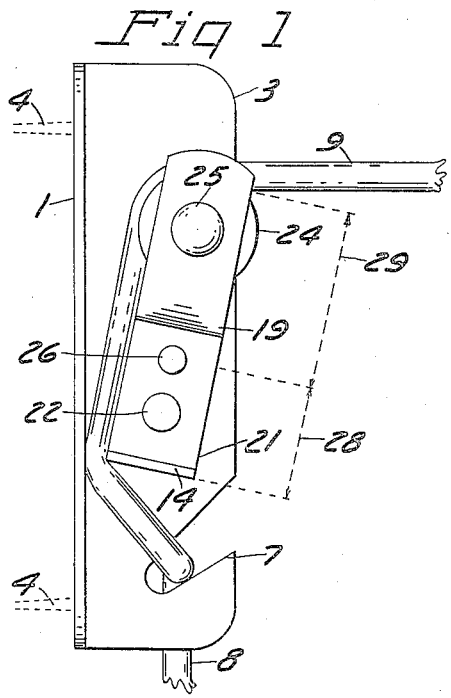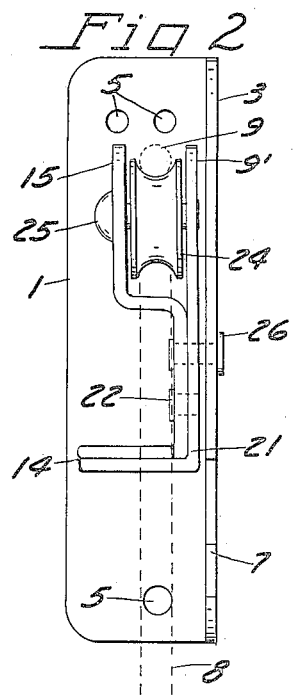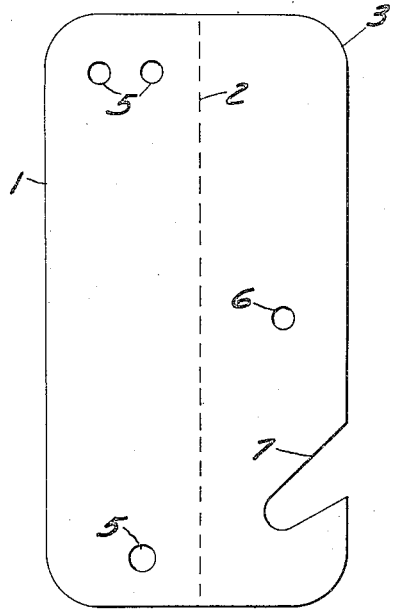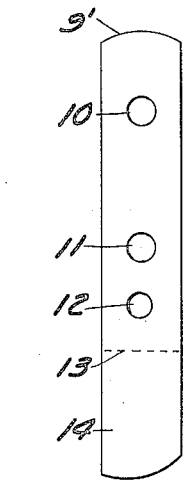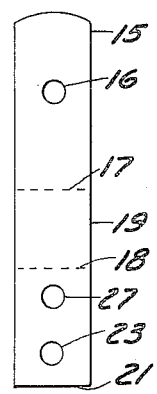

2,494,085

UNITED STATES PATENT OFFICE 2,494,085

CLOTHESLINE TIGHTENER

Dana G. Chandler, Toledo, Ohio, assignor to Roger G. Clark, Sylvania, Ohio

Application August 4, 1947, Serial No. 765,897

1 Claim. (Cl. 24—133)

This invention relates to flexible line holding and locking devices, especially wherein the line tension establishes and maintains the locking of the line against lineal shifting.

This invention has utility when incorporated in a sheet metal bracket fixture, with a lever having a roller at one end for the line to be pulled taut thereover. The opposite end of the lever and the bracket provide dual catch means for retaining the taut line locked with the device as a clothes line tightener.

Referring to the drawings:

Fig. 1 is a side elevation of an embodiment of the invention in a clothes line tightener, with the line as taut exerting a pull on the device and clamping the line with the bracket;

Fig. 2 is a view of the device from the right of Fig. 1, with the line dotted, and in position for straight-away pulling to place the line under tension in a drawing directly over the roller;

Fig. 3 is a view of a blank for the bracket of the device;

Fig. 4 is a view of the blank for the main element of the lever, from which there is the end offset for the tail locking portion for the line; and Fig. 5 is a view of the blank for the minor or complementary portion of the lever, adapted to have an intermediate offset in providing the fork for mounting the roller.

The device base is a bracket having a mounting plate portion 1, from which at a line 2, there is bent at right-angles a flange 3. There is thus provided an L-bracket for assembly with a post or support by screws 4, thru openings 5. The flange 3 has an opening 6 for a lever pivot or fulcrum, and therebelow a wedge notch 7 to pinch a tail end 8 of a line 9.

A lever 9' has a roller pin opening 10, a pivot or fulcrum pin opening 11, a rivet opening 12 and a right angle bend line 13 for a tail piece or offset 14. A complementary lever element 15 has a roller pin opening 16, right angle bend lines 17, 18, for an intermediate offset 19 with a section having a square end 21 to ride snugly against the inner end of the offset 14. A rivet 22 thru an opening 23 in the complementary lever 15 is united with the lever 9' and held against relative movement due to the tight fit for the end 21 against the offset 14.

A grooved roller 24 in the fork between the lever elements 9', 15, is mounted on a pin 25 holding the fork against spreading and mounting the roller 24 for free rotation therein. A fulcrum pin 26 thru an opening 27 in the element 15 in register with the opening 11 and thru the opening 6 of the flange, completes the mounting of the anti-friction ended lever in the bracket.

It is to be noted that there is an open side for placing the clothes line 9, to cause the line to lead directly over the roller 24. In so doing, the line end 8 may advantageously be given a direct downward pull, sufficiently to maintain the offset 14 away from pinching toward the plate 1. The roller 24 as so acted upon is an anti-friction bearing over which the line 9 may be freely drawn to a desired taut extent. Then there need be no slacking, but the operator, while still holding as taut may direct his down-pull toward the plate 1 for the offset 14 to ride into pinching cooperation with the plate 1. Step may then be taken against the possibility of sudden line slackening, or casual swinging of the end 8 to be thus freed, by drawing the line end 8 into the notch 7 of the flange 3. There is thus a second locking for efficiently holding the line 9 against casual release. However, in the event it be desired to have the line 9 cleared of the tightener device, it is only necessary to remove the end 8 from the notch 7. Then a straight down and outward pull away from the flange 3 brings the line clear of the lever lower end so that the top may ride free of the roller 24.

There is practical value in the lever control for the locking as herein disclosed. From the lever fulcrum 26 to the pinch-effective holding by the offset or tail 7 is a lever arm 28 specifically herein shown as about two thirds the effective or working length of a lever arm 29 from the fulcrum pin 26 to the taut direction line 9. This works out to mean that the squeeze of the line at the pinch tail 21, toward the plate 1 is materially in excess of the force of the taut load upon the line 9. By reference to Fig. 2, there is assembled the device comprising mounting or anchorage for the assembly by an L-bracket 1, 3. Upon the flange 3 of this bracket 1, 3, is rockably mounted a lever having a forked upper anti-friction end. The lever includes an L-element 9' 14, and a Z-element 15, 19, 21. There are three pins, all at the lever. The pivot pin 25 at the fork 9', 15, mounts the roller 24. The rivet 22 further coacts in the lever structure rigidity. The pivot pin 26 is the fulcrum rockably locating the lever with the flange 3.

What is claimed and it is desired to secure by Letters Patent is:

A clothes line tightener device comprising a Z-element and an L-element, means assembling the elements in abutting relation into a lever for one end portion of the Z-element adjacent the angle of the L-element inner side and the Z-element mid portion providing an offset from the L-element with the L-element end portion and the Z-element other end portion providing parallel arms for one end of the lever, a roller mounted to have its axis between the arms, and an L-bracket providing a mounting plate and an outward flange, said assembling means for the elements including a fulcrum for the lever thru the abutting portions of the Z- and L-elements parallel to the roller axis, said flange having a notch tapering in its extent away from the fulcrum and toward the mounting plate, said L-element portion remote from the roller providing an end for the lever swingable toward the mounting plate by line draft from across the roller with the taut line extending to be drawn into the notch by said L-element lever end portion swinging toward the plate in pinch holding the line against the plate and in the notch.

DANA G. CHANDLER.

REFERENCES CITED

The following references are of record in the file of this patent:

UNITED STATES PATENTS

| Number    | Name        | Date          |
|-----------|-------------|---------------|
| 1,084,476 | Peters      | Jan. 13, 1914 |
| 1,363,002 | Lueckenbach | Dec. 21, 1920 |
| 1,424,537 | Weth        | Aug. 1, 1922  |
| 1,592,481 | Dunne       | July 13, 1926 |
| 1,670,257 | Hagen       | May 15, 1928  |
| 1,985,989 | Hamsen      | Jan. 1, 1935  |